Jan. 23, 1923.

W. C. FRITZ.
POTATO DIGGER.
FILED APR. 19, 1917.

Inventor:
William C. Fritz
By
Atty.

Jan. 23, 1923.
W. C. FRITZ.
POTATO DIGGER.
FILED APR. 19, 1917.

Inventor:
William C. Fritz

Patented Jan. 23, 1923.

1,442,798

UNITED STATES PATENT OFFICE.

WILLIAM C. FRITZ, OF CHICAGO, ILLINOIS.

POTATO DIGGER.

Application filed April 19, 1917. Serial No. 163,281.

*To all whom it may concern:*

Be it known that I, WILLIAM C. FRITZ, a citizen of the United States, residing at Chicago, in the county of Cook and State of Illinois, have invented certain new and useful Improvements in Potato Diggers, of which the following is a specification.

This invention relates to improvements in potato diggers and one of the objects of the invention is to provide an improved machine adapted to automatically dig potatoes out of the ground without cutting or damaging the potatoes in any way, and deposit them upon the surface of the ground in close proximity to the place from which they are dug, and at the same time avoid covering the potatoes which have been removed from the ground, by dirt delivered from the machine during the further digging operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating the invention and in which:

Figure 7 is an enlarged detail view similar to Figure 6, and with parts omitted.

Figure 8 is an enlarged sectional view of a detail.

Figure 9 is an elevation of a detail.

Referring more particularly to the drawings, the numeral 10 designates generally a supporting frame or structure mounted upon the wheels 11, 12, the forward wheels 11 constituting the steering wheels which are adapted to be controlled in any suitable manner preferably by means of an operating lever 13 arranged at the rear of the machine having a bar 14 connected with the lever 13 and also with the front wheels.

Figure 4:
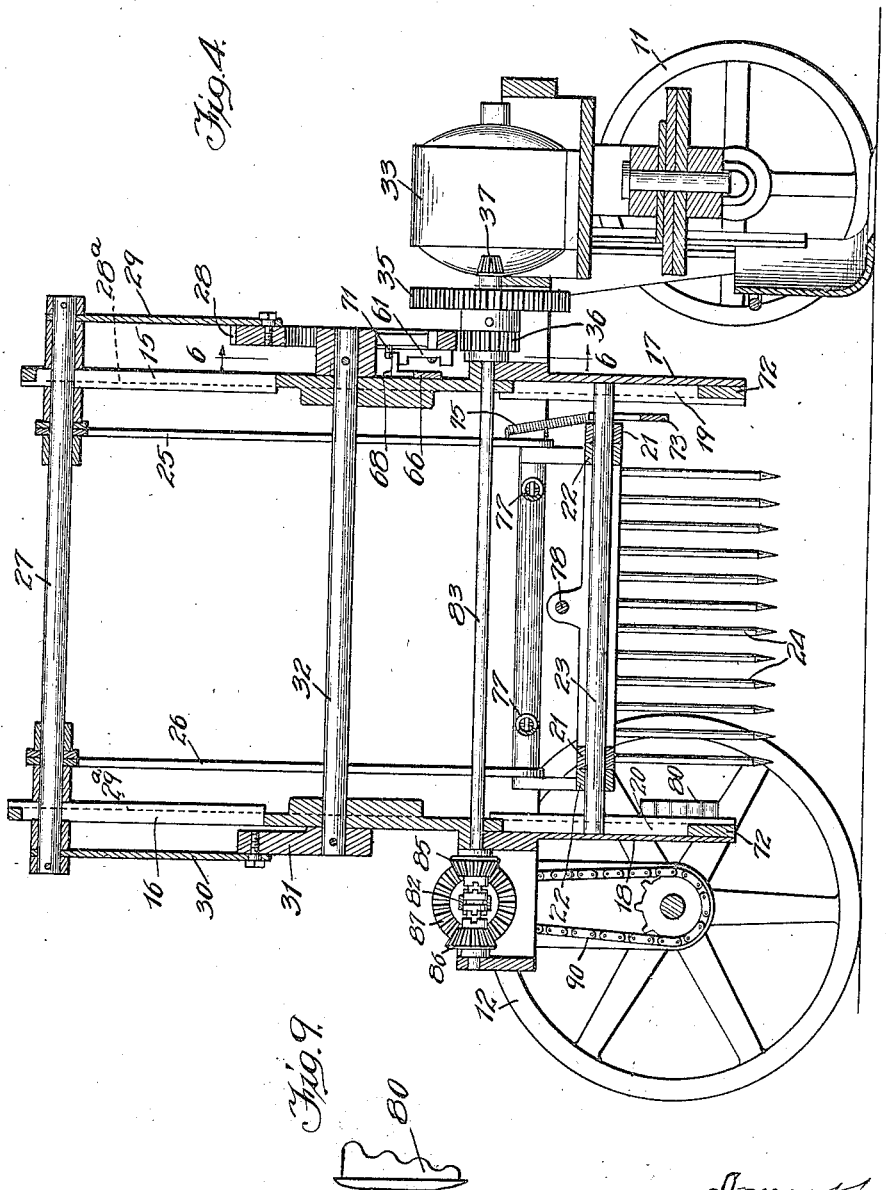
Figure 4 is a vertical longitudinal sectional view taken on line 4—4, Figure 2.
Figure 5:
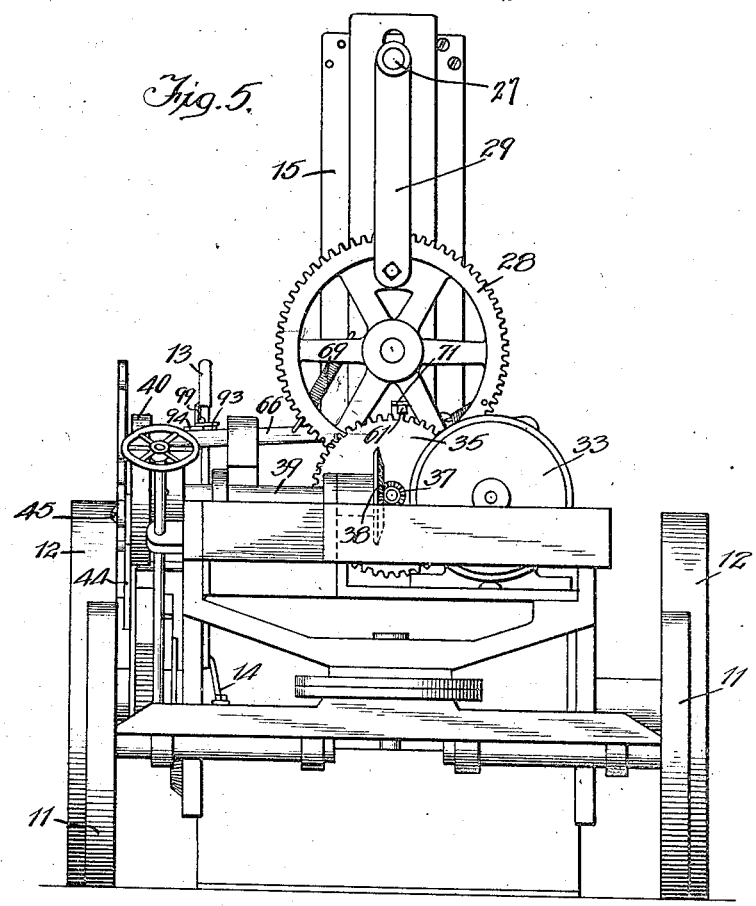
Figure 5 is a front end elevation.
Figure 6:
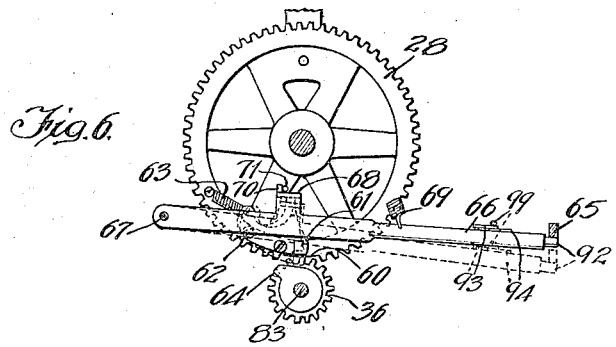
Figure 6 is a detail vertical sectional view taken on line 6—6, Figure 4.

Mounted upon the supporting structure 10 are uprights 15, 16, which are preferably spaced longitudinally of the machine, and these uprights depend below the supporting frame 10, as at 17, 18, (see particularly Figure 4) and are provided respectively in their inner faces with ways 19, 20.

Arranged to move between the uprights and the depending portions 17, 18 thereof, are oppositely disposed forks, comprising body portions 21, 22, which are of a substantially U-shape formation, and the ends of the body portions are pivotally connected preferably by means of a bar 23, the extremities of which bar project beyond the ends of the body portions of the forks and enter the ways 19, 20 to move therein when the forks are raised and lowered. These forks also embody prongs 24, which are adapted to be lowered so as to enter the ground perpendicularly and the body portions are then given a rocking motion with respect to each other so that the prongs will pass under the potatoes in the hills, after which the fork is elevated to remove the potatoes from the ground and then separated to deposit the potatoes upon the surface of the ground. This operation of the forks may be accomplished in any desired or suitable manner, but a simple and efficient means for accomplishing this result will now be described.

Each of the forks is supported by links 25, 26, that are pivotally connected by one extremity with the fork and the other extremities of the links are pivotally connected with a reciprocating member 27, which latter extends longitudinally of the machine and passes through slots 28ª, 29ª in the uprights 15, 16 and the links are connected with the forks in such a manner, and with respect to the pivotal connection of the fork members 23 in such a way, that by the reciprocation of the member 27, a bodily and pivotal movement will be imparted to the fork members. Such a reciprocating movement may be imparted in any suitable manner, preferably by means of a gear 28 which is connected by means of a link 29 with one end of the reciprocating member 27. The other end of the reciprocating member is connected by means of a similar link 30 with a crank arm 31, which latter is connected with a shaft 32 to which the gear 28 is secured. A motor 33 is provided for operating the gear 28. The motor operates a gear 34 which meshes with a gear 35, having connected with it and for rotation therewith a gear 36, which latter is adapted to mesh with the gear 28. Connected also to rotate with the gear 35, is a bevel gear 37, which meshes with a bevel gear 38 secured to a shaft 39 and this shaft has connected with it, a crank 40, preferably in the form of a disk which latter operates a link 44 through the medium of a pin and slot connection 45—46. At times it is desirable that the potato digging mechanism or forks be maintained at rest or inoperative with respect to the driving or operating mechanism therefor and to that end the gear 28 is provided with a mutilated portion 60 which is adapted to be positioned adjacent the gear 36 at the proper time, so that the gear 28 will be at rest and consequently the operation of the forks will be arrested, while the driving or actuating mechanism continues active.

At the proper time the gears 28, 36 will be automatically rendered operative with respect to each other, and this is preferably accomplished by means of a dog 61, which is pivotally mounted as at 62 upon the lateral face of the gear 28, in such a manner that the end of the dog may be projected to form a tooth adjacent the mutilated portion 60 of the gear. A spring 63 is provided for holding the end of the dog retracted.

The gear 36 has connected with it a shouldered member 64 with which the dog 61 is adapted to co-operate and the shouldered member 64 is so arranged that when the dog 61 is projected with respect to the gear 28, the dog will be engaged by the shouldered member 64 and the rotation of this shouldered member will impart a partial rotation to the gear 28 so as to shift the mutilated portion 60 of the gear with respect to the gear 36 and thereby cause the teeth of the gears 36, 28, to mesh, after which the further rotation of the gear 36 will rotate the gear 28 to reciprocate and to pivotally operate the forks.

As soon as the teeth of the gears 28, 36 are in mesh, and the shouldered member 64 has passed out of engagement with the dog 61, the latter will be retracted by the spring 63, so that when the mutilated portion 60 of the gear 28 again stands opposite the gear 36, the gear 36 may be rotated independently with respect to the gear 28.

The dog 61 may be controlled from the link 44 and to that end there may be provided an arm 65 which is connected with the link and this arm is adapted to engage a lever 66 pivotally mounted as at 67 and is provided with a laterally projecting shoulder 68, beneath which the dog 61 is adapted to pass, a spring 69 being provided for holding the shoulder 66 elevated to permit the dog to pass freely under the shoulder 68.

When the lever 66 is depressed by the arm 65, which operation will occur when the mutilated portion 60 of the gear 28 is adjacent the gear 36, the shoulder 68 will engage and depress the dog 61 and hold the same depressed so that the shouldered portion 64 will engage the dog to start the rotation of the gear 28 and this will cause the dog 61 to pass out of engagement with the shoulder 68, at the same time the arm 65 will disengage the lever 66 and the spring 69 will return the lever to its normal position.

The lever 66 is also provided with a shoulder 70, that is adapted to be positioned within the path of movement of a laterally projecting lug or pin 71 on the gear 28, at the time the mutilated portion 60 of the gear 28 stands adjacent the gear 36, to be engaged by the pin 71, which operates as a lock for locking the gear 28 against rotation. When the lever 66 is depressed to project the dog 61, the shoulder 70 will be moved out of the path of movement of the pin 71 to permit the gear 28 to rotate. The links 29, 30 are of such a length and are connected respectively with the gear 28 and crank arm 31 in such a way that the prongs 24 of the forks will be held vertical during the time that the forks are lowered and the prongs are entering the ground, but when the prongs have entered the ground, the extremities of the bar 23 which forms the pivotal connection of the forks will engage the shoulders 72 (see Figure 4) at the ends of the ways 19, 20 of the depending portions 17, 18 of the uprights 15, 16 and a further lowering of the member 27 will cause the forks to be rocked about their pivots in such a manner as to move the ends of the prongs towards each other beneath the potatoes in the ground.

Figure 1:
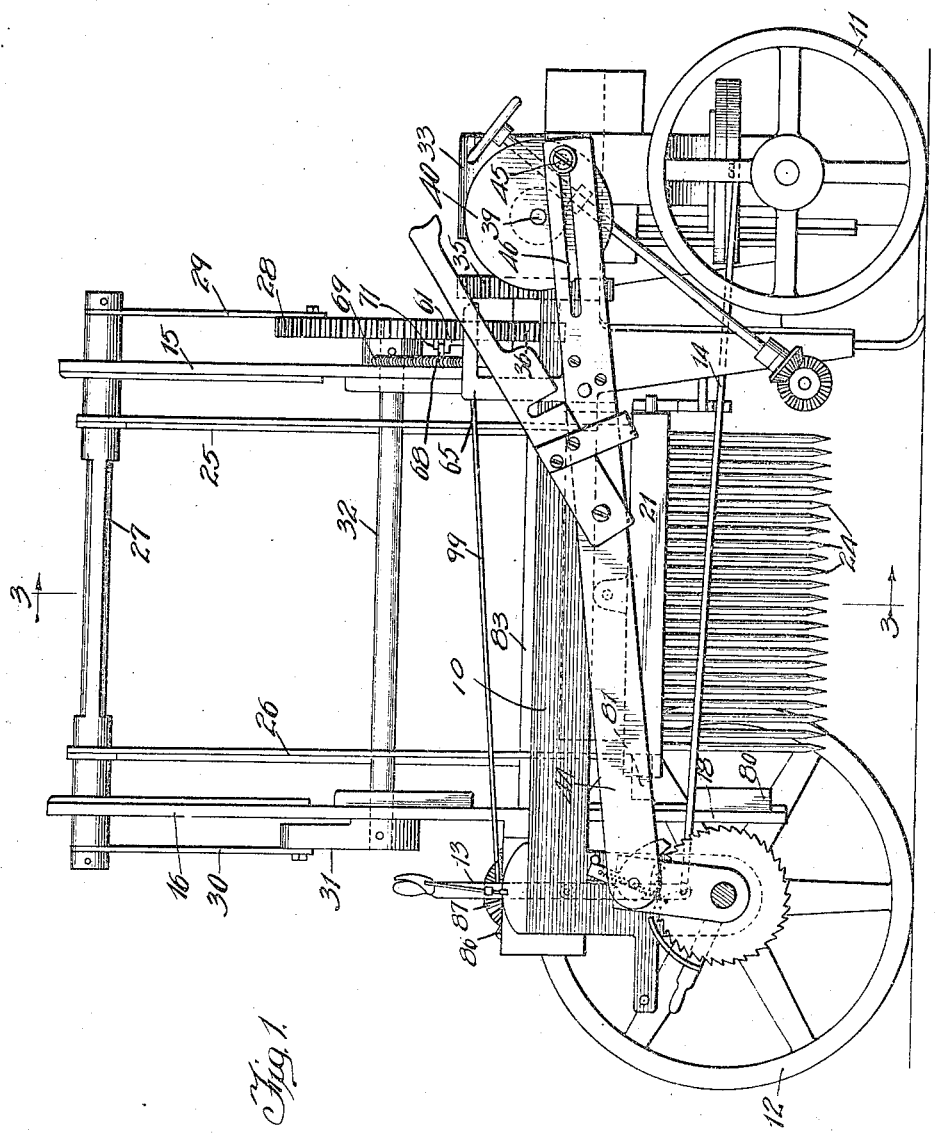
Figure 1 is a side elevation of an improved machine of this character constructed in accordance with the principles of this invention.
Figure 2:
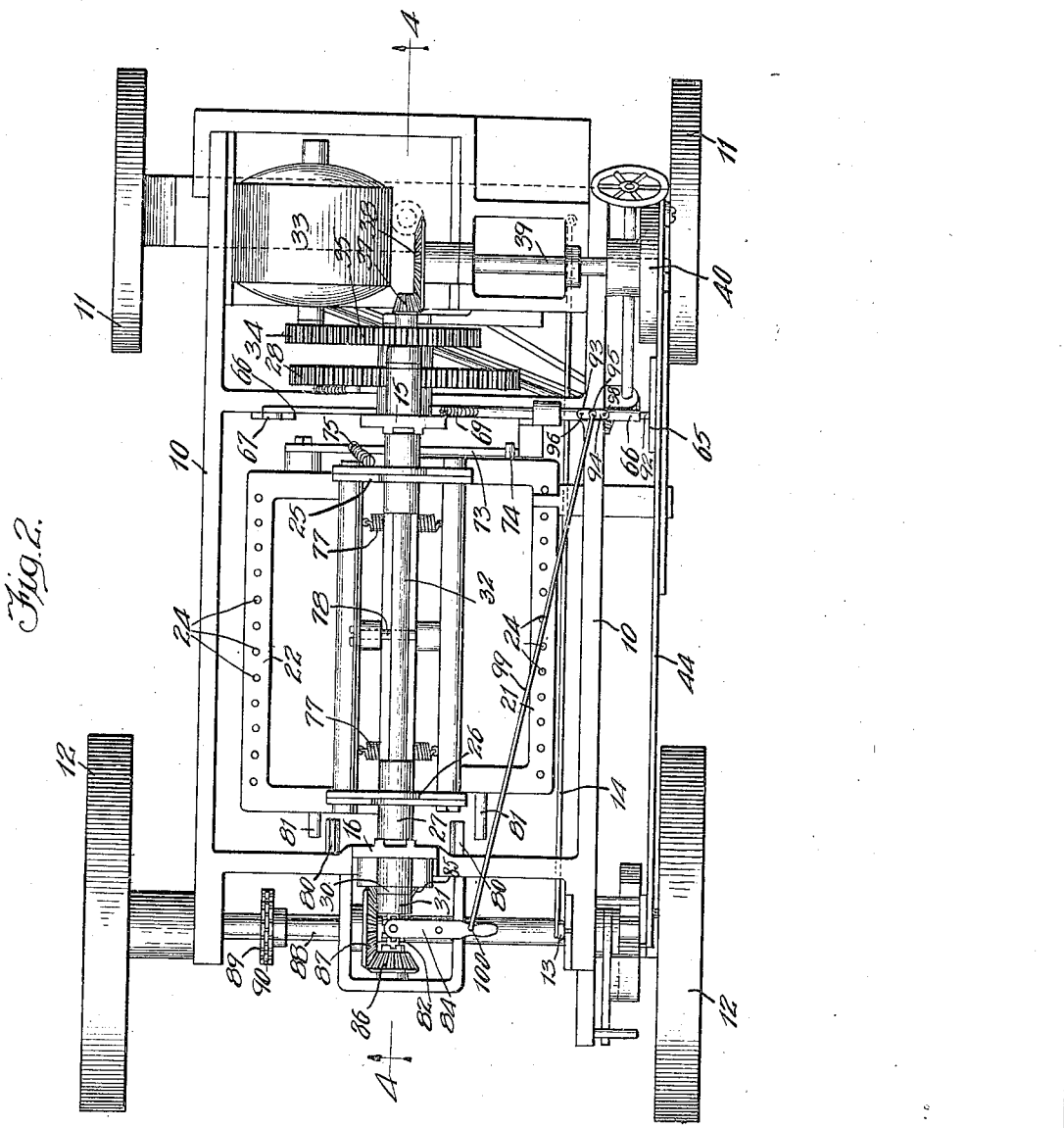
Figure 2 is a top plan view of the machine.
Figure 3:
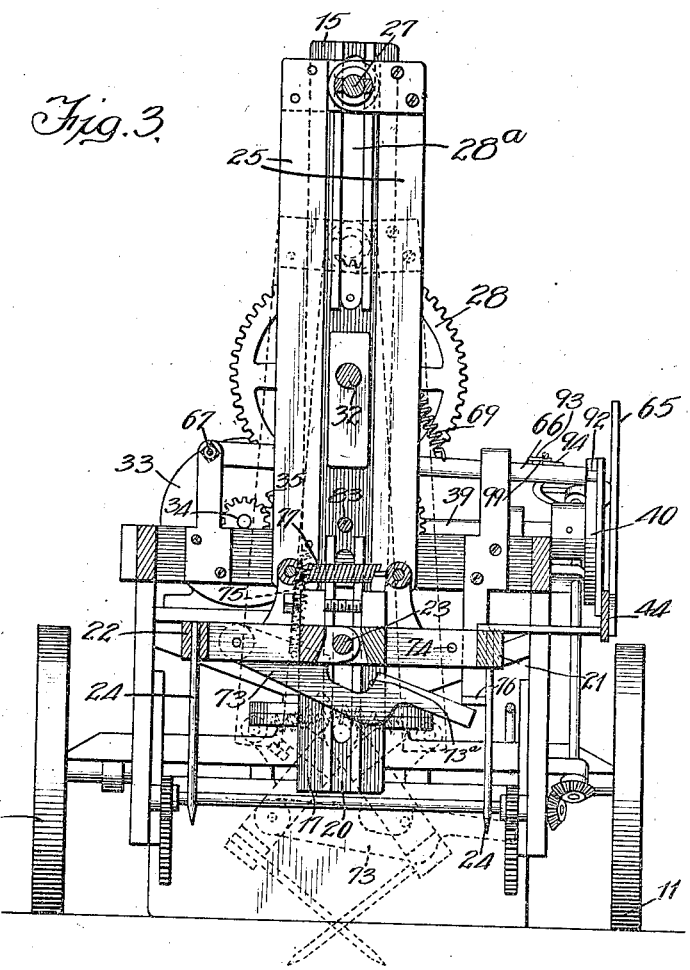
Figure 3 is a vertical sectional view taken on line 3—3, Figure 1.

The forks will then be elevated by a further operation of the links 29, 30 and the potatoes will be held between the prongs. In order to prevent the prongs from being opened by the weight of the potatoes and of the earth, a suitable spring controlled catch 73 (see particularly Figure 3), is provided which is pivotally mounted upon one of the body portions of the prongs and is provided with an open seat 73ª, adapted to receive a pin 74 on the body portion of the other fork so as to lock the forks in their closed position with respect to each other, the springs 75 operating to cause the catch to automatically engage the pin 74. The forks will remain locked until the potatoes have been removed from the ground and in order to trip the catch and release the forks so as to permit the potatoes to be deposited upon the ground, a suitable shoulder or projection 76 is provided, (see particularly Figure 3)

within the path of movement of the catch 73, which will trip the catch and release the forks. In order to open the forks when thus released, any suitable means may be provided such for instance as a spring 77 (see particularly Figure 2), and an adjustable stop device 78 may be provided for limiting the opening movement of the forks.

It is thought that the operation of the mechanism will be clearly understood from the above description, but briefly stated it is as follows:

Assuming that the gear 28 is locked against operation with respect to the gear 36 and the motor is actuated, the rotation of the crank 40 will cause the pin 45 to depress the link 44 to cause the arm 65 carried thereby to engage the lever 66 and depress the dog 61 so that it will be positioned to be engaged by the shouldered member 64 on the gear 36. This will render the gears 36, 28 active with respect to each other and the forks, the prongs of which have previously been at rest and held in a vertical position will be lowered to impale the ground, and pass under the potatoes in the ground. The extremities of the forks move towards each other until they are locked by the catch 73. The forks are then raised until they clear the ground and the catch 73 will be tripped to release the forks at which time the weight of the potatoes and the springs 77 will separate the forks and the potatoes will be deposited upon the surface of the ground.

It may be desirable to provide a means whereby the dirt which is removed by the forks with the potatoes will be removed from the forks before the potatoes are dumped, on account of damp ground or for other reasons, the dirt may adhere to the potatoes. This however, can be accomplished in any suitable manner and the prongs are caused to move towards and away from each other with an increasingly forward sweep with respect to each other. A simple and efficient means for accomplishing this comprises one or more undulated surfaces 80 which may be supported from any suitable fixed support, preferably from the main frame work of the machine. The body portion of one or both of the fork members may be provided with a projection or roller 81 adapted to roll over this surface during the elevating movement of the forks so that a vibration or agitating movement will be imparted to the forks to cause the dirt to be sifted through the forks. This movement will cause each set of prongs to sweep longitudinally between the prongs of the opposite set as well as towards and away from each other. The undulated surfaces 80 are inclined and not only serve as a locking means for preventing the weight of the material from opening the forks, but also operate to cause the forks to have an increasingly forward sweep towards each other as the projections or rollers 81 move over the inclined surface.

The direction of shifting movement of the machine may be controlled by means of a clutch member 82 which is connected with a shaft 83, to which the gear 36 is connected. The clutch member is adapted to be controlled by an operating lever 84 located in a convenient position for the operator and shifts the clutch member so as to lock one or the other of the gears 85, 86 for rotation with the shaft 83, and these gears 85, 86 mesh with the gear 87 on a shaft 88, which shaft 88 is connected by means of a sprocket wheel 89 through the medium of a sprocket chain 90 with a sprocket on the shaft of the traction wheels. Obviously, when it is desired to change the direction of travel of the machine, the dog 42 which operates with the ratchet 41 must be rendered inactive by shifting the shield 59 in the manner described.

The gears 85, 86, 87, etc. are used for the purpose of transferring the machine, not during operation of the digging of the potatoes from the ground, but from one field to another, etc. During this traveling movement of the machine under these conditions, it is desirable that the operating mechanism for the forks be also rendered inactive and to that end, the lever 66 is provided with an adjustable extremity 92 that is adapted to be engaged by the arm 65. For the purpose of shifting the extremity 92 with respect to the lever 66, there may be provided a pair of links 93, 94, pivotally connected by one extremity as at 95. The other extremity of one of the links is pivotally connected as at 96 with the lever 66, which latter is preferably tubular so that the portion having the extremity 92, may slide therein, which extremity is adapted to be projected beyond the tubular portion of the lever. The tubular portion of the lever is provided with a slot 97 and the free extremity of the other link is connected as at 98 with the internal member of the lever 66. A link 99 is pivotally connected with the joint of the links 93, 94, and this link 99 is connected as at 100 with the lever 84, that controls the clutch member 82 so that when the clutch member is shifted, the extremity 92 of the lever 66 will be withdrawn and the lever will not be actuated, so that the gears 28, 36 will remain locked with respect to each other.

When the clutch member 82 is in a neutral position, that is with respect to the gears 85, 86, the extremity 92 will be projected with respect to the lever 66 so that the arm 65 will engage the lever and actuate the same.

While the preferred form of the invention has been herein shown and described, it is to be understood that various changes may be made in the details of construction, and in the combination and arrangement of the several parts without departing from the spirit of this invention.

What is claimed as new is:

1. A potato digging machine embodying a wheel supported structure, co-operating digging members mounted upon the structure and embodying prongs adapted to enter the ground on opposite sides of the hills, said members being adapted to be bodily reciprocated towards and away from the ground, and also adapted for shifting movement to cause the prongs to pass beneath and lift the potatoes, and means for imparting such movements to the digging members.

2. A potato digging machine embodying a wheel supported structure, co-operating digging members mounted upon the structure and embodying prongs adapted to enter the ground on opposite sides of the hills and in substantially vertical positions, said members being adapted to be bodily reciprocated towards and away from the ground, and also adapted for shifting movement to cause the prongs after they enter the ground to be shifted to pass beneath and lift the potatoes, means for imparting such movements to the digging members, and means for agitating the dirt and potatoes held by the digging members.

3. A potato digging machine embodying a wheel supported structure, co-operating digging members mounted upon the structure and embodying prongs adapted to enter the ground on opposite sides of the hills, said members being adapted to be bodily reciprocated towards and away from the ground, and also adapted for shifting movement to cause the prongs to pass beneath and lift the potatoes, means for temporarily locking the digging members in co-operative relation, means for imparting such movements to the digging members, and means for imparting a vibratory movement to the diggers.

4. A potato digging machine embodying a wheel supported structure, a pair of prong shaped members mounted thereon, means for reciprocating the members to cause the prongs to enter the ground and for moving the ends of the prongs towards each other to raise the potatoes, means for locking the prongs in the last recited position with respect to each other, and means for automatically rendering the said locking means inactive to dump the potatoes.

5. A potato digging machine embodying a wheel supported structure, prong shaped members supported thereby and adapted to penetrate the ground and pass under the potatoes to lift them from the ground, means for imparting such operation to the said members, automatically operating means for locking the members with respect to each other for holding the potatoes, and means for automatically rendering the last recited means inactive to discharge the potatoes.

6. A potato digging machine embodying a wheel supported structure, prong shaped members supported thereby and adapted to penetrate the ground and pass under the potatoes to lift them from the ground, means for imparting such operation to the said members, means embodying a catch for automatically locking the said members with respect to each other for holding the potatoes, and a trip device for automatically releasing the catch.

7. A potato digging machine embodying a wheel supported structure, potato digging mechanism supported by the structure, and means for actuating the potato digging mechanism, the said means embodying oppositely disposed co-operating prong members adapted to enter the ground on the opposite sides of and pass under the potatoes to raise them out of the ground.

8. A potato digging machine embodying a wheel supported structure, potato digging mechanism supported by the structure, means for actuating the potato digging mechanism and embodying oppositely disposed co-operating prong members adapted to enter the ground on opposite sides of and pass under the potatoes to raise them out of the ground, and means for opening the prong members to drop the potatoes.

9. A potato digging machine embodying a wheel supported structure, potato digging mechanism supported by the structure and embodying means for rendering and maintaining the potato digging mechanism inactive, and means operating automatically to render the said potato digging mechanism active, said potato digging mechanism embodying co-operating prong shaped members adapted to enter the ground, pass under the potatoes and raise them from the ground.

10. A potato digging machine embodying a wheel supported structure, uprights thereon, co-operating oppositely disposed digging members mounted to bodily reciprocate upon the uprights, said members being also adapted for swinging movement towards and away from each other, means for imparting such movements to the members, and embodying a reciprocating element with which the members are connected, means for automatically locking the members when they are twung towards each other, and means for automatically releasing the members to permit them to swing away from each other.

11. A potato digging machine embodying a wheel supported structure, uprights thereon, co-operating oppositely disposed digging members mounted to bodily reciprocate upon the uprights, said members being also adapted for swinging movement towards and away from each other, means for imparting such movements to the members, and embodying a reciprocating element with which the members are connected, means for automatically locking the members when they are swung towards each other, means for automatically releasing the members to permit them to swing away from each other and means for automatically arresting the operation of the digging members.

12. A potato digging machine embodying a traveling structure, co-operating digging members mounted upon the structure and embodying prongs adapted to enter the ground on opposite sides of the hills, said members being adapted to be bodily reciprocated towards and away from the ground, and also adapted for shifting movement to cause the prongs to pass beneath and lift the potatoes, means for imparting the bodily movement to the digging members, and means for causing the prongs to move towards and away from each other with an increasingly forward sweep with respect to each other.

13. A potato digging machine embodying a traveling structure, oppositely disposed digging members supported thereby, said members being mounted for bodily movement with respect to the structure and for pivotal action with respect to each other, and means for imparting such movements to the digging members, said means embodying operating links and means pivotally connecting one of said links to each of the members, the point of pivotal connection of the links with respect to the members being offset laterally with relation to the pivot of the respective member.

In testimony whereof I have signed my name to this specification, in the presence of two subscribing witnesses, on this 14th day of April, A. D. 1917.

WILLIAM C. FRITZ.

Witnesses:
 IRMA M. BARING,
 J. H. JOCHUM, Jr.